United States Patent [19]

Ballabene et al.

[11] Patent Number: 4,466,792
[45] Date of Patent: Aug. 21, 1984

[54] WALKING BEAM FURNACE

[75] Inventors: Corrado Ballabene; Horst Dötsch, both of Erkrath, Fed. Rep. of Germany

[73] Assignee: Italimpianti Societa Italiana Impianti P.A., Genoa, Italy

[21] Appl. No.: 440,252

[22] Filed: Nov. 5, 1982

[30] Foreign Application Priority Data

Nov. 7, 1981 [DE] Fed. Rep. of Germany ....... 3144328

[51] Int. Cl.$^3$ ........................... F27B 9/14; F27D 1/16; B65G 25/00
[52] U.S. Cl. .................................. 432/122; 198/774; 432/3
[58] Field of Search .................... 432/3, 122; 198/774, 198/775

[56] References Cited

U.S. PATENT DOCUMENTS 4,116,619 9/1978 Beck ......................................... 432/3
4,330,262 5/1982 Krauzl et al. ........................ 432/122

Primary Examiner—John J. Camby
Attorney, Agent, or Firm—Berman, Aisenberg & Platt

[57] ABSTRACT

The invention relates to a walking beam furnace wherein the walking beams can be lowered beyond their operative stroke to a maintenance position. The actuating device for the walking beams comprises a hydraulic, pneumatic or electric assembly (10) and a wheel (16) rotatably mounted around a stationary axis and a preferably flexible drive-transmitting member (20) which is formed, for example, by a cable, a sprocket chain or the like, and is pivotably connected to said wheel (16). The flexible drive-transmitting member can rest on the peripheral surface of the wheel (16) both during the operative stroke of the walking beams (7) and during their lowering stroke to the maintenance position. The ramps, whereon the lifting rollers (6) for the walking beams (7) run, comprise a less-inclined upper stretch (3) and a successive more-inclined stretch (4). However, the drive-transmitting member can rest, during the operative stroke, on a support member which is co-axial with the wheel and has a smaller diameter than the wheel. In the latter case, the ramps whereon the lifting rollers (6) move may have a uniform slope.

8 Claims, 6 Drawing Figures

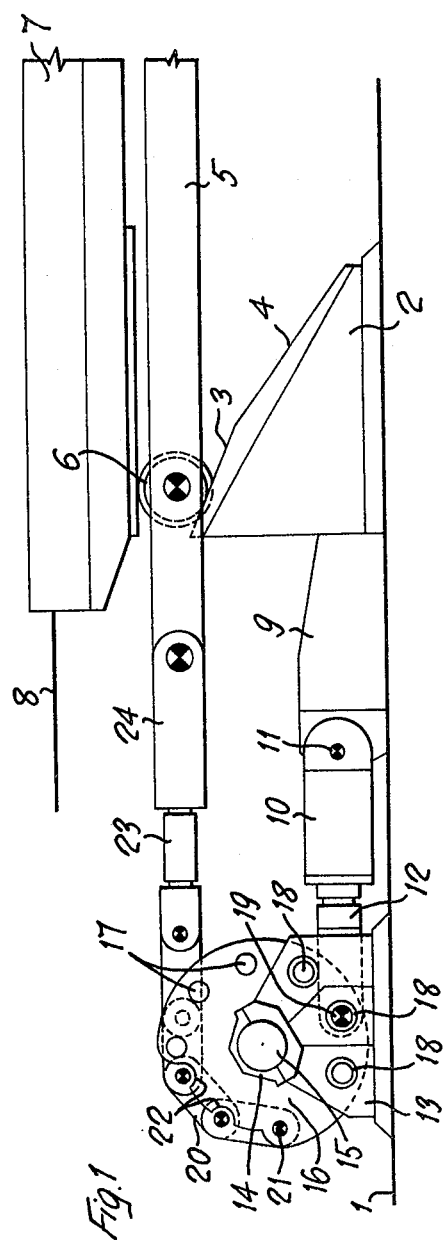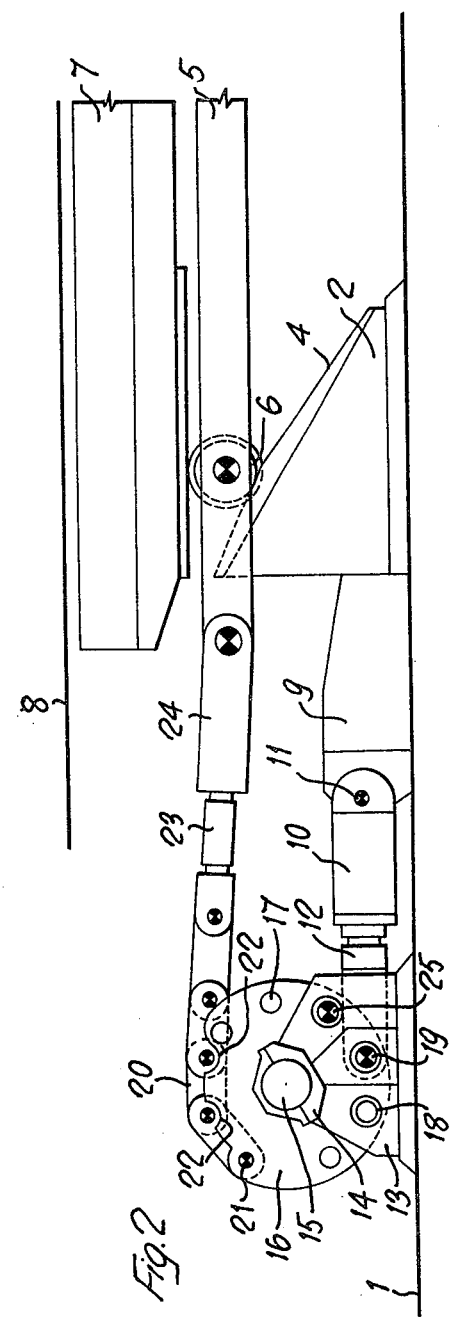

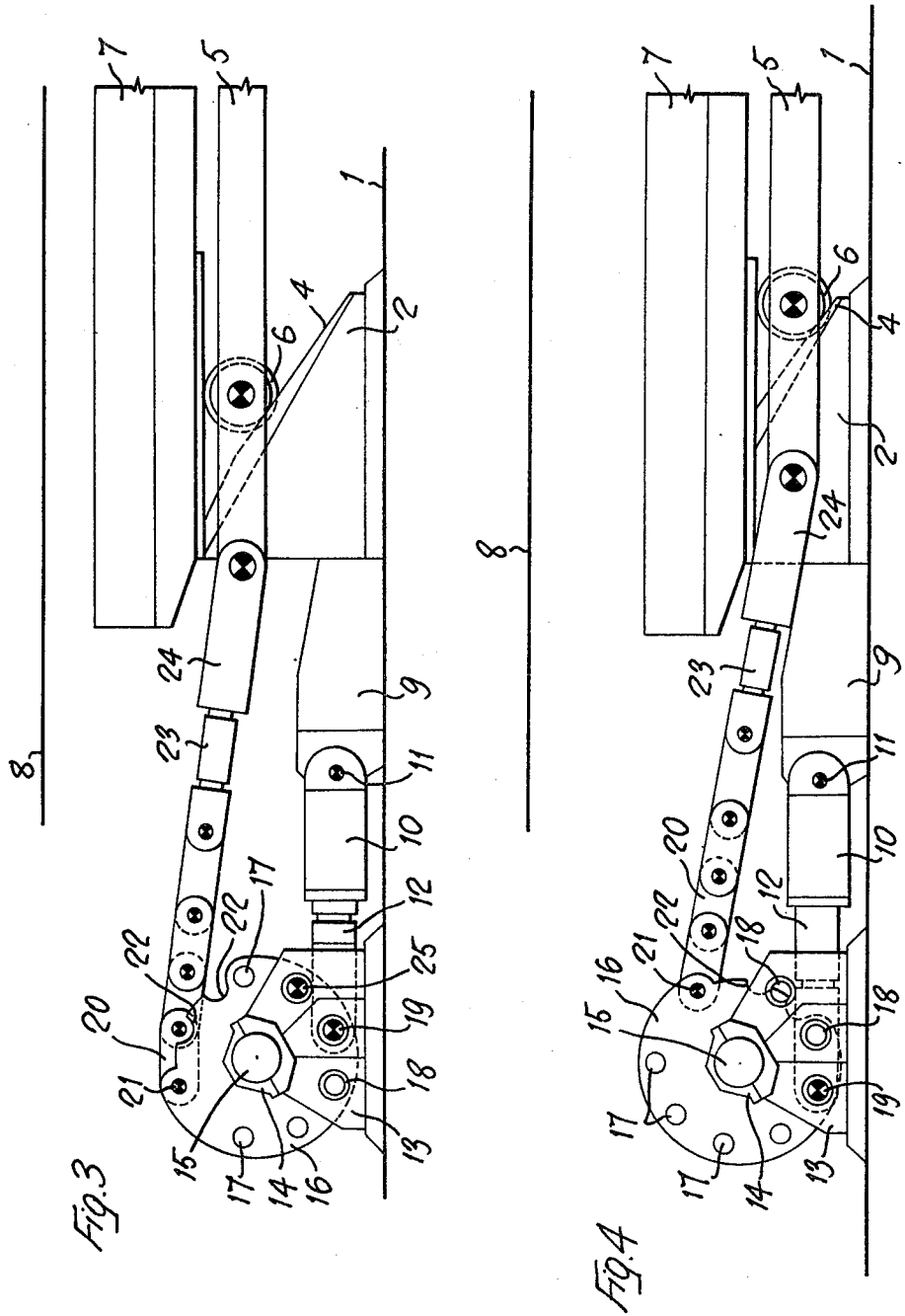

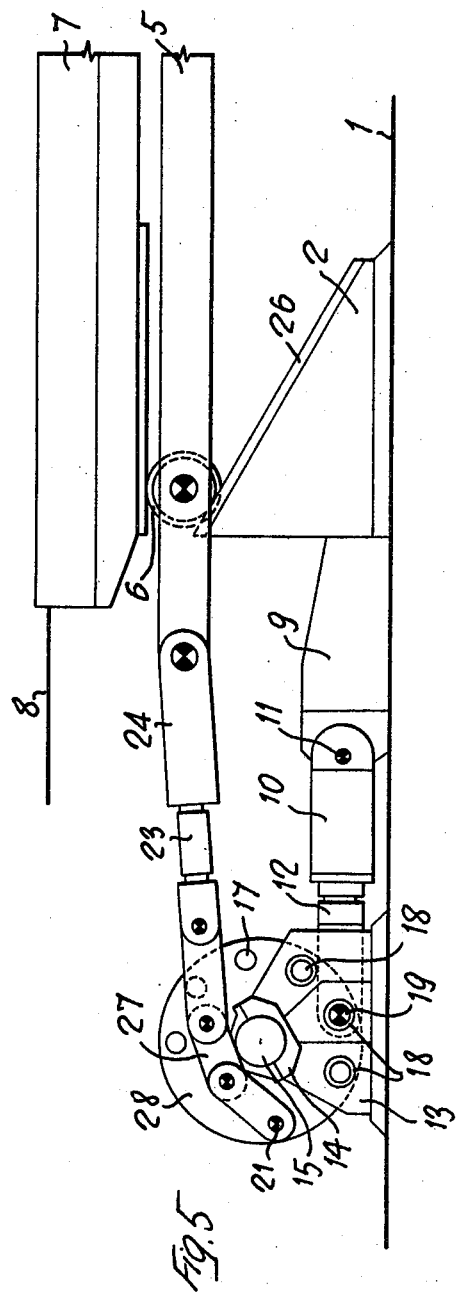
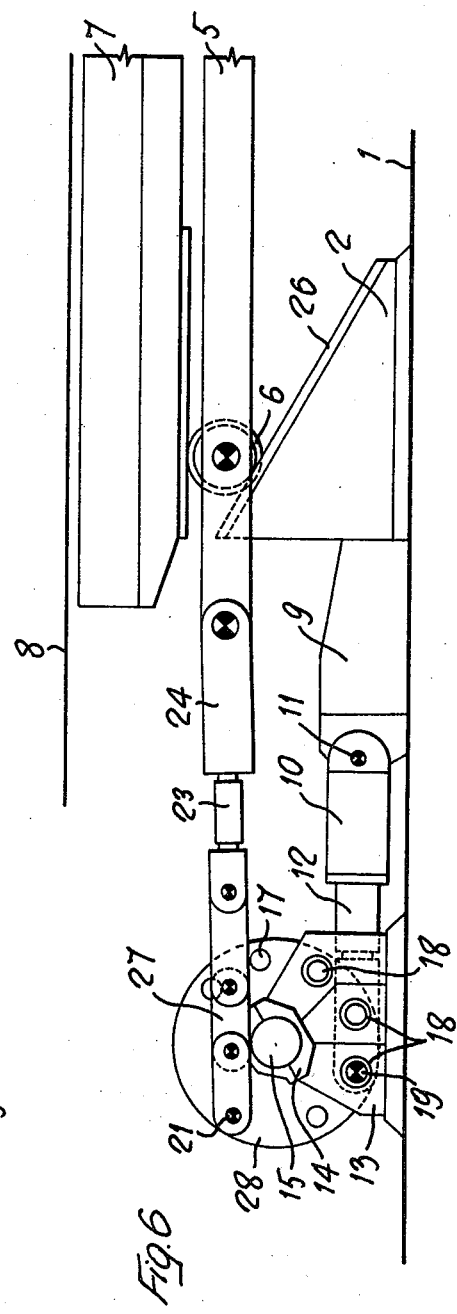

WALKING BEAM FURNACE

BACKGROUND AND SUMMARY OF THE INVENTION

This invention relates to a walking beam furnace the hearth of which consists of alternately-disposed fixed beams and walking beams, wherein the walking beams have associated therewith lifting rollers which are mounted on a lifting frame and which run on ramps that are prolonged downwards by a longer distance than is required for the working stroke or lift thereof.

A furnace of this type is illustrated in the U.S. Pat. No. 4,330,262. In this furnace, the walking beams can be lifted, together with the articles to be heated and by means of lifting rollers running on the ramps, beyond the hearth of the furnace and then moved forwards, whereupon the walking beams are lowered again below the hearth of the furnace and moved backwards to the starting position thereof. Thus, the articles to be heated can be advanced step by step through the heating furnace. The ramps whereon the lifting rollers run are prolonged downwards to such an extent permitting the walking beams to be lowered to a lowermost position wherein both the walking beams and fixed beams can be reached for repair and maintenance purposes. The lifting rollers can be moved by an extensible lifting rod which is pivoted to a lifting frame mounting the lifting rollers. Said lifting rod is fixed to an oscillating arm which is pivoted on a support stand and is moved by an actuating cylinder. In order to depress the walking beams into their maintenance position, the lifting frame is moved by an extent corresponding to the stroke of the piston of said cylinder and is then locked against any further movement. The lifting rod is then detached from the oscillating arm and the piston is moved back to its other end position. Thereafter, an extension rod is inserted between the lifting rod and the oscillating arm, and the lifting frame is then unlocked. Thereafter, the actuating cylinder is activated again so as to cause a further downward movement of the walking beams. Thus, the lifting rod is extended step by step and the lifting rollers will run farther and farther downwards on the ramps. The walking beams then follow this lowering movement correspondingly.

By pivotally connecting the lifting rod at a plurality of pivot points established at different distances from the fulcrum of the oscillating arm, a plurality of different drive-ratios are obtained between the movement of the actuating cylinder and the movement of the lifting rod and, therefore, walking beams. However, said drive-ratio can be changed only within a narrow range, i.e. about 2:1, because a compromise is necessary between the operative stroke or lift and the depression stroke into the repair position, when the latter stroke is to be performed by a minimum of steps. The locking of the lifting rod and the addition of each extension rod after each lowering step require additional labor, particularly when the lowering into the repair position requires a great number of individual steps. This disadvantage is not very serious in case of small walking beam furnaces because the weight difference between a loaded walking beam effecting its operative lift and an unloaded walking beam while being lowered into its maintenance position is not very great.

However, in case of larger walking beam furnaces, said weight difference is considerable and requires that the lowering stroke be composed of a great number of individual steps, or that the actuating device for the walking beam be much more powerful.

Inasmuch as only the operative lift requires a great power, whereas the successive lowering or depression stroke to reach the maintenance position is effected practically with no load, the invention aims to improve the walking beam furnaces described in the preamble so that, while maintaining their constructional simplicity and minimizing the costs, the operative lift shall require a relatively small actuating force and the lowering stroke to the maintenance position shall be effected at a faster rate.

The solution of this problem is based on a variable-ratio drive for the actuation of the walking beams. Particularly, the invention comprises a drive-transmitting member in the form of a control rod or, preferably, a sprocket chain or a cable, which is pivoted at one end to an end of the lifting frame and at the other end to a wheel which is rotatably mounted around a fixed axis. This wheel is rotated by a hydraulic, pneumatic or electric mechanism which is pivotably connected at one end to said wheel and at the other end to a reaction-bearing support.

The long and heavy oscillating arm is thus eliminated, and the walking beams can be stopped in any position by locking said wheel. For this purpose, a supporting stand for the wheel can be provided with holes co-operating with a plurality of registering holes spaced around the periphery of the wheel, and suitable locking pins can be inserted thereinto. The holes spaced around the periphery of the wheel also serve for connecting to different points of the wheel a pivotal eye of the actuating cylinder assembly, by means to a removable pivot pin, whereby with a relatively small stroke of the actuating assembly, a step by step rotation of the wheel is obtained over half of a round angle, or even more.

On the other hand, the ramps may comprise, as is known in the art, a less steep stretch or length for the operative stroke or lift, and a more steep stretch or length for the lowering or depression stroke to the maintenance position. This construction of the ramps is advantageous, because the operative stroke or lift is smaller than the lowering stroke into the maintenance position, and because the effort at the less steep stretch of the ramp is (even under heavy loads) much smaller than that required at a more steep stretch, such as that for the lowering stroke into the maintenance position.

When the ramps for the lifting rollers comprise a less steep stretch and a more steep stretch, but also when the ramps are continuous and uniform, a variable-ratio drive for actuating the walking beams can be obtained according to the invention by means of a drive-transmitting member which is pivoted to the wheel so as not to rest on the peripheral surface of the wheel. When said drive-transmitting member is formed by a control rod connected to the lifting frame, said rod is pivoted to the wheel in such a way that, to perform the operative lift, a rotation of the wheel corresponding to the stroke of the actuating assembly causes only a small translational movement of the control rod and, therefore, a small lift of the walking beams, whereas the lowering stroke to the maintenance position corresponds to an almost tangential movement of the control rod with respect to the wheel and, therefore, to a correspondingly longer stroke.

When the drive-transmitting member is formed by a flexible member, for example a cable or a sprocket chain, such a member is pivoted to the wheel as described above and rests, during the operative lift, on a support member co-axial with the wheel and having a diameter smaller than the wheel. During the operative lift, the drive-transmitting flexible member rests on said smaller-diameter support member and the movement of the lifting frame is a function of the radius of this support member. When the wheel is rotated step by step by the actuating assembly to such an extent that the drive-transmitting member is raised from said smaller-diameter support member, the movement of the lifting frame is increased by an extent corresponding to the distance between the centre of the wheel and the taut flexible drive-transmitting member, thus initiating the lowering stroke to the maintenance position.

When the drive-ratio between the actuating assembly and the lifting frame is to be unchanged, the wheel is so constructed as to permit the drive-transmitting member to rest on the peripheral surface of the wheel. In this instance, the operative lift and the lowering stroke to the maintenance position can be differentiated from each other only by the differently-inclined stretches of the ramps.

BRIEF DESCRIPTION OF THE DRAWINGS

The invention will be better explained hereinafter with reference to the two embodiments thereof shown in the accompanying drawings, in which:

FIG. 1 is a diagrammatic side elevational view of an actuating device for the walking beams, in the upper position thereof during the operative stroke.

FIG. 2 is a view similar to FIG. 1, in the lower position during the operative stroke.

FIG. 3 is a similar view after the first step in the lowering or depression stroke into the repair position.

FIG. 4 is a similar view at the end of the lowering or depression stroke in the repair position.

FIG. 5 is a side elevational view of another embodiment of the actuating device for the walking beams, with a variable-ratio drive, in the upper position thereof, during the operative stroke.

FIG. 6 is a view similar to FIG. 5, in the lower position thereof, during the operative stroke.

DESCRIPTION OF THE PREFERRED EMBODIMENTS

With reference to the drawings, only the actuating device for the walking beams of the furnace is shown. As for the other details of the walking beam furnace, reference is to be made to the U.S. Pat. No. 4,330,262 mentioned above.

Located below the walking beams is a base 1 having fixed thereon blocks 2 which are provided, on the upper surface thereof (in the embodiment of FIGS. 1 to 4), with tracks having a less-inclined upper stretch 3 and a successive more-inclined stretch 4. A lifting frame 5 is provided with rollers 6 which can roll over inclined ramps 3 and 4 and under a walking beam 7. The walking beam projects slightly above the hearth 8 of the furnace when the actuating device for the walking beams is in the upper position thereof during the operative stroke, as shown in FIG. 1.

Fixed on the base 1 is a support 9 bearing the reaction, through a pivotal connection 11, of a cylinder-and-piston assembly 10. The assembly 10 is provided with a push-rod 12 which is received through a supporting stand 13 which fixedly supports a bearing 14 for a shaft 15 mounting a wheel 16. The peripheral edge of the wheel 16 is formed with holes 17 which can coincide with corresponding holes 18 formed in the supporting stand 13 and are designed to receive a pin. The push-rod 12 can be pivotally connected to said wheel 16 by means of a connecting pivot 19 inserted in one of the holes 17 in the wheel 16. A sprocket chain 20 is connected at one end by a connecting pivot 21 to the peripheral edge of the wheel 16 and at the other end by a regulating screw 23 and a pivotable clevis 24 to the lifting frame 5. The peripheral surface of the wheel 16 is formed with supporting recesses 22 for the chain links, whereby the chain 20 around the wheel 16 will be always at the same distance from the axis of rotation of the wheel 16.

When the push-rod 12 of the cylinder-and-piston assembly 10 is moved outwards, the wheel 16 is moved to the angular position shown in FIG. 2, and the rollers 6 of the lifting frame roll over the less-inclined stretch 3 of the ramp, whereby the walking beam moves to the lower position of its working stroke, as shown in FIG. 2. In order to lift it again to the upper position, the push-rod 12 is retracted into the cylinder-and-piston assembly 10 and the walking beam 7 is moved again to the position shown in FIG. 1.

When the walking beam 7 is to be lowered from the working condition to the maintenance condition, a stop pin 25 is inserted into a hole 18 of the supporting stand 13 and into a registering hole 17 of the wheel 16, whereupon the pivot 19 connecting the push-rod 12 and wheel 16 is removed. The push-rod 12 is then retracted into the cylinder assembly 10 and the connecting pivot 19 is inserted again into a hole 17 in the wheel and push-rod 12. The stop-pin 25 is then removed and the push-rod can be extended again outwards. This operation will be repeated, as shown in the FIGS. 3 and 4, until the lowermost maintenance position in the depression stroke is reached.

In the embodiment of FIGS. 1 to 4, the ratio of the drive from the cylinder-and-piston assembly 10 to the lifting frame 5 is substantially constant, whereby any variation of the drive-ratio is effected solely by virtue of the less-inclined stretch 3 and more-inclined stretch 4 of the blocks 2.

In the embodiment of FIGS. 5 and 6, however, each ramp is provided on the upper side with a uniformly inclined track 26, but the sprocket chain 27 and wheel 28 are modified so that the drive-transmitting member cannot rest on the peripheral surface of the wheel 28, but it rests laterally of the wheel on a support member having a smaller diameter, as shown in FIG. 5.

At the angle of rotation of the wheel shown in the FIGS. 5 and 6, the resulting drive-ratio corresponds substantially to the distance between the holes 17 or central axis of the chain 27 and the centre of the wheel. Thus, in the condition shown in the FIGS. 5 and 6, the push-rod 12 of the cylinder-and-piston assembly 10 will cause the operative stroke of the walking beams, whereas a further rotation of the wheel 28, corresponding to that of FIGS. 3 and 4, will cause a considerably longer stroke, since the connecting pivot 21 now moves substantially tangential to the circumference of the wheel 28.

Obviously, the variable-ratio drive according to FIGS. 5 and 6 can be also performed in combination with differently-inclined ramps according to FIGS. 1 to 4 to obtain, with a same stroke of the cylinder-and-piston assembly 10, different strokes of the walking beams 7 in the operative stage and when being lowered into the maintenance position thereof.

A particular advantage of the drive mechanism according to the invention resides in the fact that, when being lowered step by step, the lifting frame can be locked at the same position and by the same means used at intervals to lock the push-rod 12 of the cylinder-and-piston assembly 10 to the wheel 16–28, and to unlock it therefrom.

A further advantage of the device according to the invention resides in the fact that the pivotal connection between the wheel 16, 28 and lifting frame 5 need not be disconnected, and that no extension members are necessary.

We claim:

1. A walking beam furnace of the type in which a hearth comprises a fixed beam and a walking beam, wherein the walking beam has associated therewith lifting roller means mounted on a lifting frame and which runs on an inclined ramp which extends downwardly by a distance longer than is necessary for said walking beam to engage an object by an operative stroke, characterized by a drive-transmitting member (20, 27) for transmitting force connected at one end to said lifting frame (5) and at another end to a wheel means (16, 28) for imparting motion to said drive-transmitting member, said wheel means being mounted for rotation around a stationary axis.

2. A walking beam furnace according to claim 1 characterized by the fact that the drive-transmitting member comprises a sprocket chain (27) or a cable.

3. A walking beam furnace according to claim 1, characterized by a support member (15) for supporting said wheel means and for engaging said drive-transmitting member (27).

4. A walking beam furnace according to claim 1, characterized by a hydraulic, electric or pneumatic actuating assembly (10) for providing a force pivotally connected at one end to the wheel (16, 28) and at another end to a reaction-bearing support (9).

5. A walking beam furnace according to claim 4, characterized by a supporting stand (13) for supporting the wheel means (16, 28), and having a plurality of first holes (18) for receiving a stop pin means (25), said first holes in the supporting stand (13) co-operating with a plurality of second holes (17) formed around the periphery of the wheel means (16, 28) to prevent rotation of said wheel means with respect to said support stand when said stop pin means is received in said first and second holes.

6. A walking beam furnace according to claim 5, characterized by the fact that said actuating assembly (10) is provided with a pivotal eye means for providing a pivotal connection and is connected to the wheel (16, 28).

7. A walking beam furnace according to claim 1, characterized by the fact that said ramps comprise a less-inclined stretch (3) and a more-inclined stretch (4).

8. A walking beam furnace according to claim 2, characterized by the fact that said wheel (16) is formed with peripheral supporting recesses (22) for engaging the drive-transmitting member (20).

* * * * *